US010675624B2

(12) United States Patent
White et al.

(10) Patent No.: US 10,675,624 B2
(45) Date of Patent: Jun. 9, 2020

(54) GENERATION AND TRAPPING OF AQUEOUS DROPLETS IN A MICROFLUIDIC CHIP WITH AN AIR CONTINUOUS PHASE

(71) Applicant: University of Maryland, College Park, College Park, MD (US)

(72) Inventors: Ian M. White, Ellicott City, MD (US); Srinivasa Raghavan, Columbia, MD (US); Kunal R. Pandit, Laurel, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 16/252,020

(22) Filed: Jan. 18, 2019

(65) Prior Publication Data

US 2019/0224672 A1 Jul. 25, 2019

Related U.S. Application Data

(62) Division of application No. 15/857,754, filed on Dec. 29, 2017, now Pat. No. 10,183,291, which is a (Continued)

(51) Int. Cl.
*B01L 3/00* (2006.01)
*G01N 21/00* (2006.01)
*G01N 1/10* (2006.01)

(52) U.S. Cl.
CPC ... *B01L 3/502715* (2013.01); *B01L 3/502784* (2013.01); *B01L 2200/0621* (2013.01); (Continued)

(58) Field of Classification Search
CPC ................. B01L 3/00; B01L 3/502715; B01L 3/502784; B01L 2200/0621; B01L 2200/0642; G01N 21/00; G01N 1/10
See application file for complete search history.

(56) References Cited

U.S. PATENT DOCUMENTS 5,738,728 A 4/1998 Tisone
2008/0213593 A1* 9/2008 Bala Subramaniam .................... B01F 3/0807 428/402.2

(Continued)

FOREIGN PATENT DOCUMENTS

CN 101718795 B 8/2012
WO 2008/097559 A2 8/2008

OTHER PUBLICATIONS

Chandamany Arya et al., "Capturing rare cells from blood using a packed bed of custom-synthesized chitosan microparticles," Journal of Materials Chemistry B, vol. 1, No. 34, pp. 4313-4319 (2013).

(Continued)

*Primary Examiner* — Brian J. Sines
(74) *Attorney, Agent, or Firm* — Rothwell, Figg, Ernst & Manbeck, P.C.

(57) ABSTRACT

The invention relates to a method and system for generating droplets of an aqueous solution on a microfluidic chip with an air continuous phase. Specifically, the droplet generator according to the present invention is integrated into a microfluidic chip to generate and introduce droplets of an aqueous solution into the microfluidic chip. The droplets travelling in a network of chip channels may be captured in on-chip traps in a manner defined by hydrodynamic resistances of chip channels. A biological reaction may be performed on a droplet trapped on the microfluidic chip.

1 Claim, 6 Drawing Sheets

Related U.S. Application Data division of application No. 15/160,891, filed on May 20, 2016, now Pat. No. 9,855,555.

(60) Provisional application No. 62/164,381, filed on May 20, 2015.

(52) U.S. Cl.

CPC .................. *B01L 2200/0642* (2013.01); *B01L 2200/0673* (2013.01); *B01L 2300/088* (2013.01); *B01L 2300/0816* (2013.01); *B01L 2300/0838* (2013.01); *B01L 2300/0858* (2013.01); *B01L 2300/0864* (2013.01); *B01L 2300/10* (2013.01); *B01L 2300/14* (2013.01); *B01L 2300/18* (2013.01); *B01L 2400/0487* (2013.01); *B01L 2400/0666* (2013.01); *B01L 2400/0688* (2013.01)

(56) References Cited

U.S. PATENT DOCUMENTS

| | | | |
|---|---|---|---|
| 2009/0014640 | A1 | 1/2009 | Schaumloffel et al. |
| 2011/0151578 | A1* | 6/2011 | Abate .............. B01L 3/502746 436/180 |
| 2011/0312841 | A1 | 12/2011 | Silverbrook et al. |
| 2013/0028812 | A1 | 1/2013 | Prieto et al. |
| 2014/0017150 | A1 | 1/2014 | Wang et al. |
| 2014/0051062 | A1 | 2/2014 | Vanapalli et al. |
| 2014/0117228 | A1 | 5/2014 | St. Cyr et al. |
| 2014/0158233 | A1* | 6/2014 | Leslie ............... B01L 3/502715 137/561 R |
| 2015/0034163 | A1 | 2/2015 | Abate et al. |
| 2015/0184151 | A1 | 7/2015 | White et al. |
| 2015/0258520 | A1 | 9/2015 | Griffiths et al. |
| 2015/0292988 | A1 | 10/2015 | Bharadwaj et al. |
| 2016/0051958 | A1 | 2/2016 | Kung et al. |
| 2016/0086785 | A1* | 3/2016 | Chiu .................. H01J 49/0445 250/282 |
| 2016/0132060 | A1* | 5/2016 | Zukas .................... B33Y 70/00 137/1 |
| 2016/0271513 | A1* | 9/2016 | Weitz ...................... B01D 1/18 |
| 2016/0339430 | A1 | 11/2016 | White et al. |
| 2017/0216844 | A1* | 8/2017 | Garnica Rodriguez .................... B01L 3/502784 |

OTHER PUBLICATIONS

Nichols, "Droplet-Based Microfluidic Systems Coupled to Mass Spectrometry for Enzyme Kinetics," pp. 109-114 (Apr. 9, 2009).

Bithi et al., "Behavior of a train of droplets in a fluidic network with hydrodynamic traps," Biomicrofluidics 4, 044110 (2010).

* cited by examiner

GENERATION AND TRAPPING OF AQUEOUS DROPLETS IN A MICROFLUIDIC CHIP WITH AN AIR CONTINUOUS PHASE

CROSS-REFERENCE TO RELATED APPLICATION

This application a divisional of U.S. patent application Ser. No. 15/857,754, filed on Dec. 29, 2017, which is a divisional of U.S. patent application Ser. No. 15/160,891, filed on May 20, 2016, now U.S. Pat. No. 9,855,555, which claims the benefit of priority to U.S. Provisional Application No. 62/164,381, filed May 20, 2015, the disclosures of which are hereby incorporated by reference in their entireties.

BACKGROUND

Field of the Invention

The invention relates to a droplet generator incorporated into a microfluidic chip.

Specifically, the droplet generator generates droplets of an aqueous solution on a microfluidic chip with an air continuous phase.

Discussion of the Background

The detection of nucleic acids and the ability to perform biochemical assays and the like is central to medicine, forensic science, industrial processing, crop and animal breeding, and many other fields. The ability to detect disease conditions (e.g., cancer), infectious organisms (e.g., HIV), genetic lineage, genetic markers, and the like, is ubiquitous technology for disease diagnosis and prognosis, marker assisted selection, correct identification of crime scene features, the ability to propagate industrial organisms and many other techniques. Determination of the integrity of a nucleic acid of interest can be relevant to the pathology of an infection or cancer.

Other biochemical assays, including the detection of proteins or other markers in a sample are relevant both to disease and disorder detection as well as environmental safety.

One of the most powerful and basic technologies to detect small quantities of nucleic acids is to replicate some or all of a nucleic acid sequence many times, and then analyze the amplification products. Polymerase Chain Reaction ("PCR") is perhaps the most well-known of a number of different amplification techniques.

PCR is a powerful technique for amplifying short sections of DNA. With PCR, one can quickly produce millions of copies of DNA starting from a single template DNA molecule. PCR includes a three phase temperature cycle of denaturation of DNA into single strands, annealing of primers to the denatured strands, and extension of the primers by a thermostable DNA polymerase enzyme. This cycle is repeated so that there are enough copies of the amplified DNA to be detected and analyzed. For general details concerning PCR, see Sambrook and Russell, Molecular Cloning—A Laboratory Manual (3rd Ed.), Vols. 1-3, Cold Spring Harbor Laboratory, Cold Spring Harbor, N.Y. (2000); Current Protocols in Molecular Biology, F. M. Ausubel et al., eds., Current Protocols, a joint venture between Greene Publishing Associates, Inc. and John Wiley & Sons, Inc., (supplemented through 2005) and PCR Protocols A Guide to Methods and Applications, M. A. Innis et al., eds., Academic Press Inc. San Diego, Calif. (1990).

Microfluidic chips are being developed for "lab-on-chip" devices to perform biochemical assays including in vitro diagnostic testing. The largest growth area is in molecular biology where DNA amplification is performed in the sealed channels of the chip. Optical detection devices are commonly used to measure the increasing amplicon product over time (Real Time PCR) and/or to perform a thermal melt to identify the presence of a specific genotype (High Resolution Thermal Melt).

Droplet PCR is well known in the art, and has previously taken the form of an aqueous droplet surrounded by an immiscible fluid, such as an oil, a fluorinated liquid, or any other non-aqueous or hydrophobic solvent. However, droplet PCR using an oil phase has some drawbacks.

Use of a water-in-oil droplet requires additional materials in comparison to standard PCR (i.e., oils, surfactants, etc.), and proteins can be denatured at the oil-water interface due to their contact with the oil, which can lead to irreversible protein adsorption onto the surface of a microfluidic channel. Further, the viscosity of oil requires slower flowrates than can be achieved with other materials.

Droplet PCR has particularly been used in lab-on-chip applications, both in flow-through microfluidic channels (biochemical reactions may be performed on the samples either while stationary or while flowing through the channel) and in microfluidic systems incorporating traps in which the droplets can be contained in the microfluidic system. For instance, hydrodynamic traps are described in Bithi and Vanapalli ("Behavior of a train of droplets in a fluidic network with hydrodynamic traps", Biomicrofluidics 4, 044110 (2010)).

Bithi and Vanapalli describe the use of both passive and active methods for trapping and storing droplets in microfluidic systems. In some instances, passive trapping is preferred as it is more scalable to allow multiplexing than active trapping may be. Bithi and Vanapalli describe two methods of passive trapping, direct and indirect trapping, which are based on the hydrodynamic resistance of an upper and lower branch of a microfluidic system containing a repetitive series of loops, as is shown in FIG. 1. As noted in FIG. 1, this system of trapping droplets is designed to work with a water-in-oil system, as described above. The effectiveness of trapping droplets in such a system is dependent on droplet size and droplet spacing, requiring precise control of the water-in-oil droplet formation Oil flow rate is a key factor in the performance of such a system, and system parameters would need to be optimized for the specific oil or other surfactant used in creating the droplets.

Accordingly, a need exists in the art for alternate systems and methods of preparing droplets for use on microfluidic chips that overcome these drawbacks.

SUMMARY OF THE INVENTION

In one aspect of the invention, a method for generating aqueous droplets in an air phase on a microfluidic chip is provided. The method is performed by using a valve having a first inlet, a second inlet, and an outlet. Specifically, the method comprises inserting a capillary into the first valve inlet and towards the valve outlet. In the next step, an outer tubing is threaded onto the capillary, wherein the capillary and the outer tubing are in fluid communication with an inlet microchannel of the microfluidic chip. Next, the outer tubing is sealed within the first inlet. Droplets of an aqueous solution are formed by applying the pressure to flow the aqueous solution through the capillary and into the inlet microchannel. The next step of the method is directed to continuously introducing the air phase through the second inlet and the outer tubing into the inlet microchannel, wherein the droplets are continuously formed at the tip of the inner capillary and then sheared off by air.

In yet another aspect of the invention, a system for generating droplets of the aqueous solution in a continuous air phase on a microfluidic chip is provided. The system comprises a valve having a first valve inlet, a second valve inlet, and a valve outlet. A capillary is inserted into the first valve inlet and towards the valve outlet. An outer tubing threaded onto the capillary and sealed within the first inlet is provided. The capillary and the outer tubing are configured to be in fluid communication with a network of microfluidic microchannels of the microfluidic chip. Furthermore, a pressure regulator is provided to form droplets of the aqueous solution by drawing the aqueous solution into the capillary and into the channel network of the microfluidic chip, wherein the droplets are sheared off by the air phase continuously introduced through the second valve inlet and the outer tubing into the microchannels of the microfluidic chip.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF PREFERRED EMBODIMENTS

The present invention has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

The invention relates to a method and system for generating droplets of an aqueous solution on a microfluidic chip with an air continuous phase. Specifically, the droplet generator according to the present invention is integrated into a microfluidic chip to generate and introduce droplets of an aqueous solution into the microfluidic chip. Droplets are captured in on-chip traps based on hydrodynamic resistances of chip channels that are defined by channel dimensions and geometry. A biological reaction may be performed on a droplet trapped on the microfluidic chip.

Figure 1:
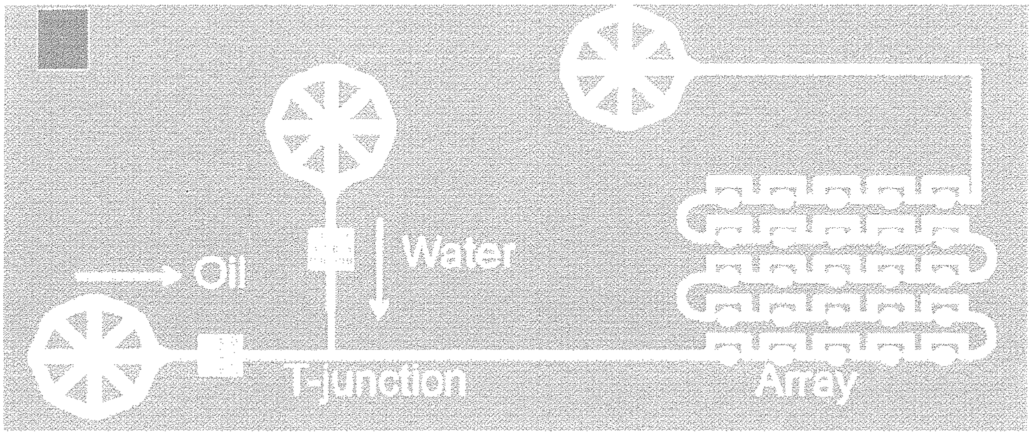
FIG. 1 is a schematic representation of the microfluidic trapping device according to related art.
Figure 2A:
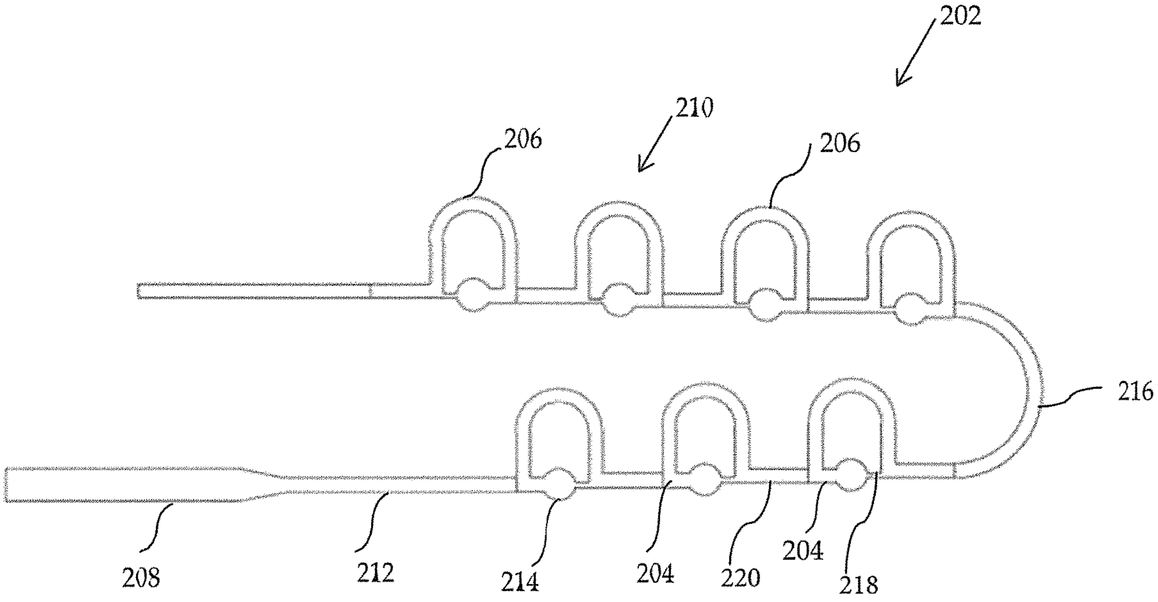
FIG. 2A is a layout of a series arrangement of a trap array.

FIG. 2A demonstrates a layout of a microfluidic chip 202 having a series arrangement of a trap array. The microfluidic chip 202 is designed to directly or indirectly hydraulically trap sample droplets. Loops 210 are arranged in an array in which the sample droplets encounter each trap location in series. Each loop 210 consists of a lower branch having the trap 214 to trap sample droplets and an upper branch (bypass) to bypass the trapped droplets. To avoid breaking droplets apart, the channel geometries are designed to eliminate concave corners and sharp curves which could break up droplets. Specifically, the upper branch is shaped as an arc and the upper and lower trap rows are connected by a U-turn 216 rather than three straight microchannels. In one embodiment, the lower branch 204 is comprised of various channel widths and geometries. The upper branch 206 is comprised of an loop-shaped channel having a rectangular cross-section at a constant width. The loops 210 are connected by a microfluidic channel 212. A droplet generator may be connected to the microfluidic chip 202 through an inlet channel 208. Hydrodynamic resistances of the low and upper branches, $R_U$ and $R_L$, are defined by the geometry of the channels and traps. Traps are designed such that the exit of the trap is much narrower than the entrance. Thus to exit a trap, the captured droplet must overcome a large interfacial force to squeeze through the exit. Droplets follow the path of least resistance, therefore if $R_U/R_L<1$, then the droplet bypasses the trap. If the opposite is true, and $R_U/R_L>1$, then droplets are held in the trap.

By way of non-limiting example, the height of the channels 212 and 208 may be from about 100 μm to about 300 μm and the width of the inlet channel 208 may be from about 300 μm to about 500 μm to allow the droplets generator to be easily inserted in the inlet channel 208. The upper branch 206 may be comprised of a rectangular channel at a constant width of from about 100 μm to about 300 μm, and preferably about 200 μm. Different hydraulic resistance ratios of the upper branch ($R_U$) to the lower branch ($R_L$) may be achieved by varying the length of the upper channel and keeping the width of the lower channel set. In one non-limiting embodiment, the width of the lower channel is set to 85 μm and the width of the upper branch is set to 200 μm.

Figure 2B:
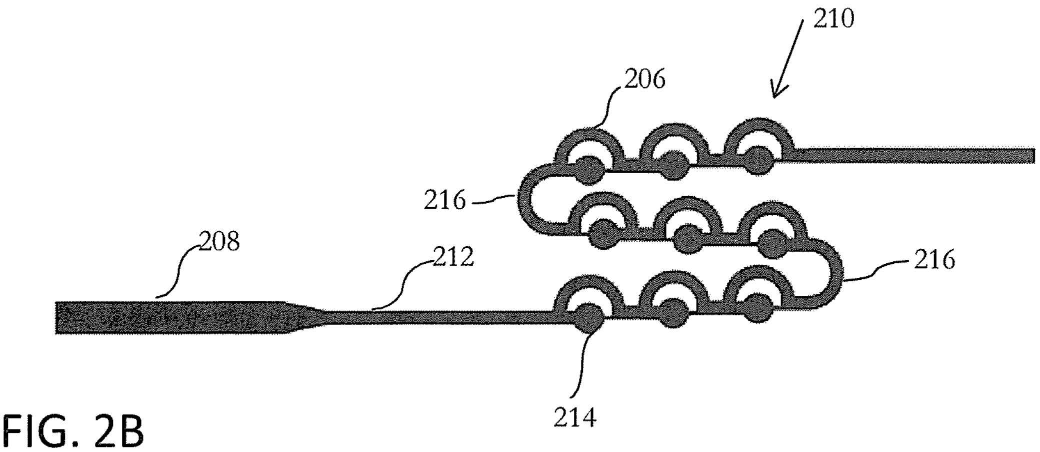
FIG. 2B is a layout of a series arrangement of a trap array according to another embodiment of the present invention.
Figure 6:
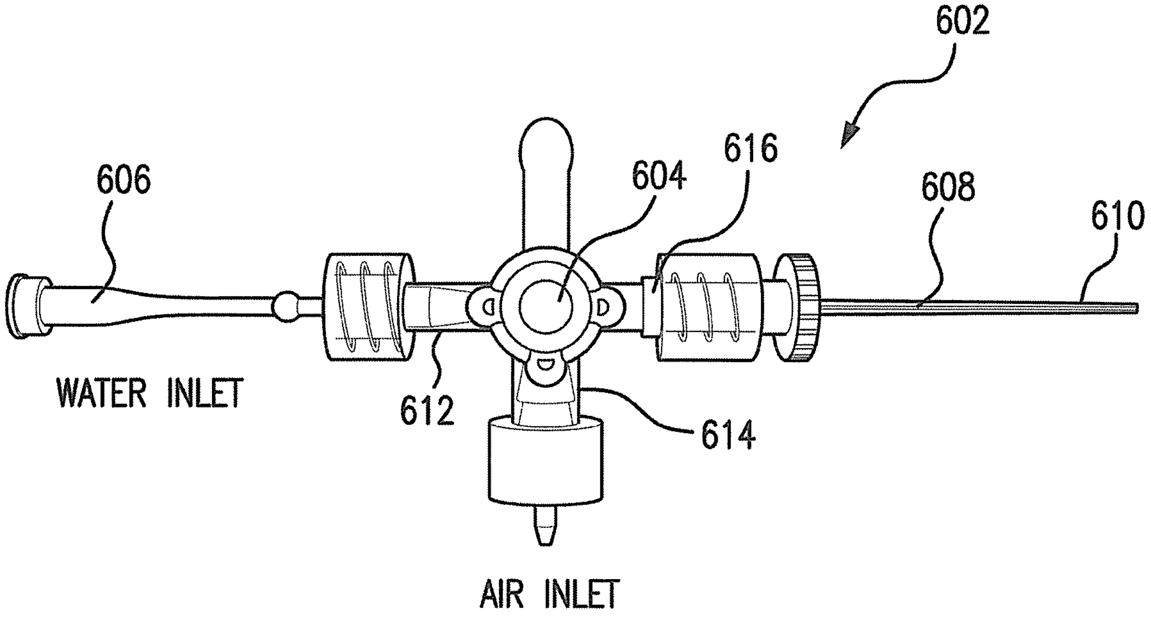
FIG. 6 is an arrangement of the co-flow droplet generator according to an embodiment of the invention.

FIG. 2B demonstrates trap arrangements according to another embodiment of the present invention. The inlet channel 208 tapers down to the channel 212 enabling the co-flow droplet generator as shown in FIG. 6 to be inserted into the microfluidic chip 202 through the inlet channel 208, parallel with the trap rows. The traps are serially connected in rows while the rows are connected in a step like fashion. Although FIG. 2B shows a trap layout having three rows, each row including three traps, the number of rows and the number of traps in each row is not limited by the embodiment shown in FIG. 2B. In fact, any selected number of rows and traps can be used for trapping droplets on the microfluidic chip 202. As concave corners are prone to breaking apart droplets, the trap exit channel 218 is extended into the trap connecting channel 220 so that a concave corner is not formed. The rows are connected by a U-turn 216. In one non-limiting embodiment, the inlet channel 208 is 500 μm wide while the channel 212 is 300 μm wide.

Figure 3:
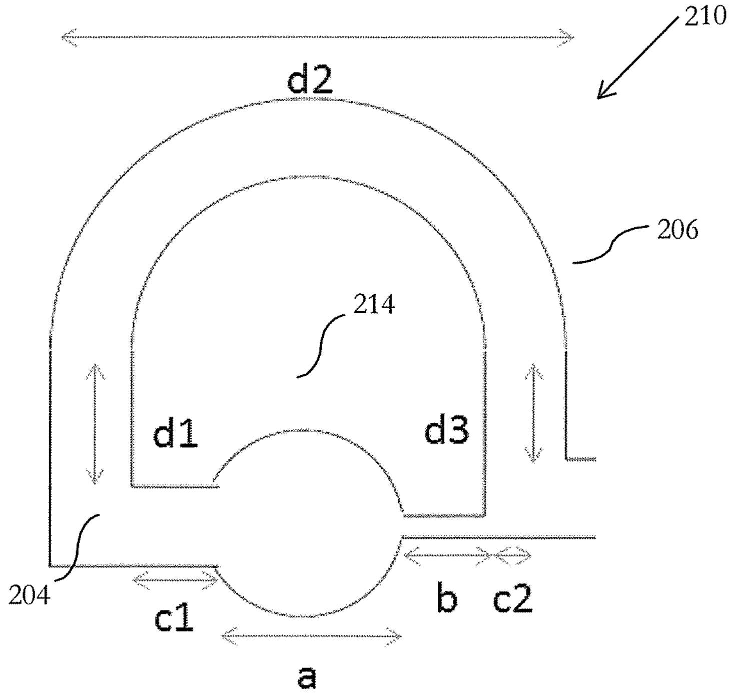
FIG. 3 is a schematic representation of trap dimensions.

An individual loop 210 is presented in greater details in FIG. 3. Specifically, FIG. 3 demonstrates dimensions and geometries of a hydraulic trap. The upper branch 206 that bypasses the trap consists of channel segments d1, d2, and d3. The lower branch 204 that goes through the trap consists of channel segments c1, a, b, and c2.

Table 1 demonstrates different designs of a hydraulic trap, as specified in column 1, characterized by different lengths (Ld1, Ld3, La, Lb, Lc1, Lc2) and widths (Wd1, Wd3, Wa, Wb, Wc1, Wc2) of sections d1, d3, a, b, c1, c2. The hydraulic resistance ratio of the upper channel (branch) to the lower channel (branch), $R_L/R_U$, is calculated for each design and presented in the last column of Table 1. Specifically, the last column of table 1 shows five different ratios of lower to upper branch resistance $R_L/R_U$ that were tuned by varying the length L of segments d1 and d3 in the hydrodynamic loop.

TABLE 1

| Design | Ld1 µm | Ld3 µm | La µm | Lb µm | Lc1 µm | Lc2 µm | Wd1 µm | Wd3 µm | Wa µm | Wb µm | Wc1 µm | Wc2 µm | $R_L/R_U$ |
|---|---|---|---|---|---|---|---|---|---|---|---|---|---|
| 300_85_0 | 0 | 0 | 675 | 300 | 450 | 100 | 200 | 200 | 675 | 85 | 300 | 100 | 1.59 |
| 300_85_100 | 100 | 57.5 | 675 | 300 | 450 | 100 | 200 | 200 | 675 | 85 | 300 | 100 | 1.49 |
| 300_85_1000 | 1000 | 957.5 | 675 | 300 | 450 | 100 | 200 | 200 | 675 | 85 | 300 | 100 | 0.86 |
| 300_85_500 | 500 | 457.5 | 675 | 300 | 450 | 100 | 200 | 200 | 675 | 85 | 300 | 100 | 1.12 |
| 300_85_750 | 750 | 707.5 | 675 | 300 | 450 | 100 | 200 | 200 | 675 | 85 | 300 | 100 | 0.97 |

The hydraulic resistances, $R_n$, for different sections of the upper and lower channels (branches) may be estimated by using analytical equations. To approximate the hydraulic resistance in a straight rectangular channel of sections d1, d2, d3, c1, a, b, and c2, equation (1) was used.

$$R_n = \frac{12\mu L}{h^3 w}\left[1 - \sum_{n,odd}^{\infty} \frac{1}{n^5} \times \frac{192}{\pi^5} \times \frac{h}{w}\tanh\left(\frac{n\pi w}{2h}\right)\right]^{-1}, \quad (1)$$

where µ is the dynamic viscosity of air, L is the length of a channel section, and h and w are the height and width of the channel (w>h). The accuracy of equation (1) is achieved by selecting a sufficient number n of terms in the sum. See, for example, Bithi and Vanapalli (Biomicrofluidics 4, 044110 (2010)). The hydraulic resistance of the square portions of the lower channel (segments c1 and c2) was estimated according to the equation $R=28.47\ \mu L/h^4$. The total resistance of the upper channel, $R_U$, and lower channel, $R_L$, respectively, may be calculated as the sum of the resistances of channel segments.

Figures 4A, 4B:
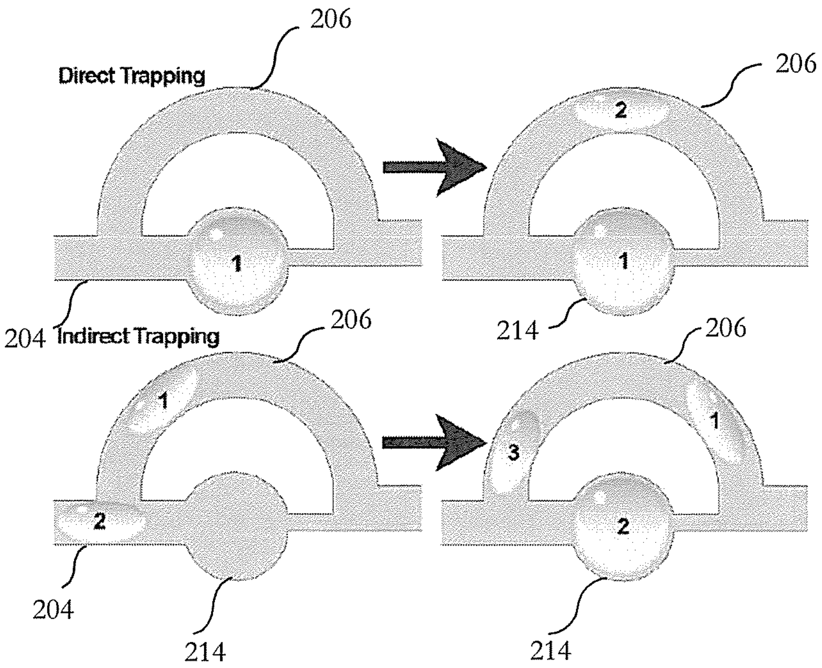
FIG. 4A and FIG. 4B is a schematic representation of direct and indirect hydraulic trapping, respectively.

FIG. 4A illustrates direct hydraulic trapping approach in a microfluidic array. Alternatively, FIG. 4B illustrates indirect hydraulic trapping approach in a microfluidic array. FIGS. 4A-B show the loop 210 (FIG. 2) presented at two different points in time. Specifically, in FIG. 4A, when the hydrodynamic resistance $R_L$ of the lower channel (branch) 204 is smaller than the hydrodynamic resistance $R_U$ of the upper channel (branch) 206, the first droplet in the train enters the lower branch 204 and gets captured in the hydrodynamic trap 214. If droplet 1 gets captured, then the subsequent droplet 2 chooses the upper branch 206 because of the increased hydrodynamic resistance generated by the trapped droplet 1 in the lower branch 204. Alternatively, in FIG. 4B, when $R_L$ is greater than $R_U$, the first droplet will enter the upper branch 206, blocking the flow due to the hydrodynamic resistance of the moving droplet 1, and then the next droplet 2 will enter the hydrodynamic trap in the lower branch 204 and may get captured in the trap 214. The next droplet 3 then proceeds to the upper branch 206.

FIG. 5 is a flowchart demonstrating a method for fabricating a Polydimethylsiloxane (PDMS) microfluidic chip 202 according to one embodiment of the present invention. Steps 502-510 are directed to fabricating a master mold on a silicon wafer. In one non-limiting embodiment, negative photoresist SU-8 2075 may be used for mold fabrication. In step 502, the wafer is first cleaned in a piranha bath, rinsed, and then dehydrated. In one non-limiting embodiment, dehydration may be performed at 120° C. for 10 min. A two-step spin coating process (step 504) may be used to achieve a specific thickness of the chip. To apply the first coat, photoresist is spin-coated on the wafer and soft baked. Then, a second layer of photoresist is spin coated. In one non-limiting embodiment, photoresist was spin-coated to the thickness of 225 µm, then soft baked at 100° C. The wafer was allowed to cool to room temperature and then a second layer of photoresist was spin coated to the thickness of 75 µm. The second layer was soft baked at 100° C. for 20 min. After the coating process, the wafer is rehydrated for one hour at ambient temperature and humidity. Next, in step 506, the wafer is exposed to UV light. In one non-limiting embodiment, the wafer was exposed to 25 $mW/cm^2$ UV light for 30 s. Immediately after the exposure, the wafer was baked for 6 min at 65° C. and 16 min. at 95° C. In step 508, uncured negative photoresist is removed with developer by gentle agitation. In one non-limiting embodiment, uncured photoresist SU-8 was removed with SU-8 developer by gentle agitation for 18 min. In step 510, the wafer was rinsed and then baked. In one non-limiting example, the wafer was rinsed with isopropyl alcohol (IPA) and DI water, and then baked overnight at 80° C.

A PDMS chip was fabricated in step 512 by using the mold fabricated in steps 502-510. In one non-limiting embodiment, the PDMS chip was fabricated with the base and curing agent mixed in a 10:1 ratio. Top pieces, 5 mm in thickness, were cured on the SU-8 master mold for 10 min. in an oven at 80° C. Bottom pieces, 1 mm in thickness, were partially cured on a clean silicon wafer using a hotplate. The hotplate was initially at room temperature and then set to 90° C. after placing the wafer. While the PDMS was slightly tacky and not fully cured, after about 20 min., the top pieces were bonded to the bottom pieces and cured an additional 10 min.

In step 514, sidewalls of the channels are modified to be superhydrophobic, vapor-resistant, or both. In one non-limiting embodiment, superhydrophobic walls were created through the lotus effect and roughening the sidewalls with a PDMS etchant (3:1 N-Methyl-2-pyrrolidone (NMP): Tetrabutylammonium fluoride (TBAF)) for 2 min. The etchant is removed by flowing DI water through the chip. Vapor-resistant channels are made by coating the sidewalls with parylene through a chemical vapor deposition process. Channels are made both superhydrophobic and vapor-resistant by first etching the sidewalls and then coating them in parylene.

Figure 5A:
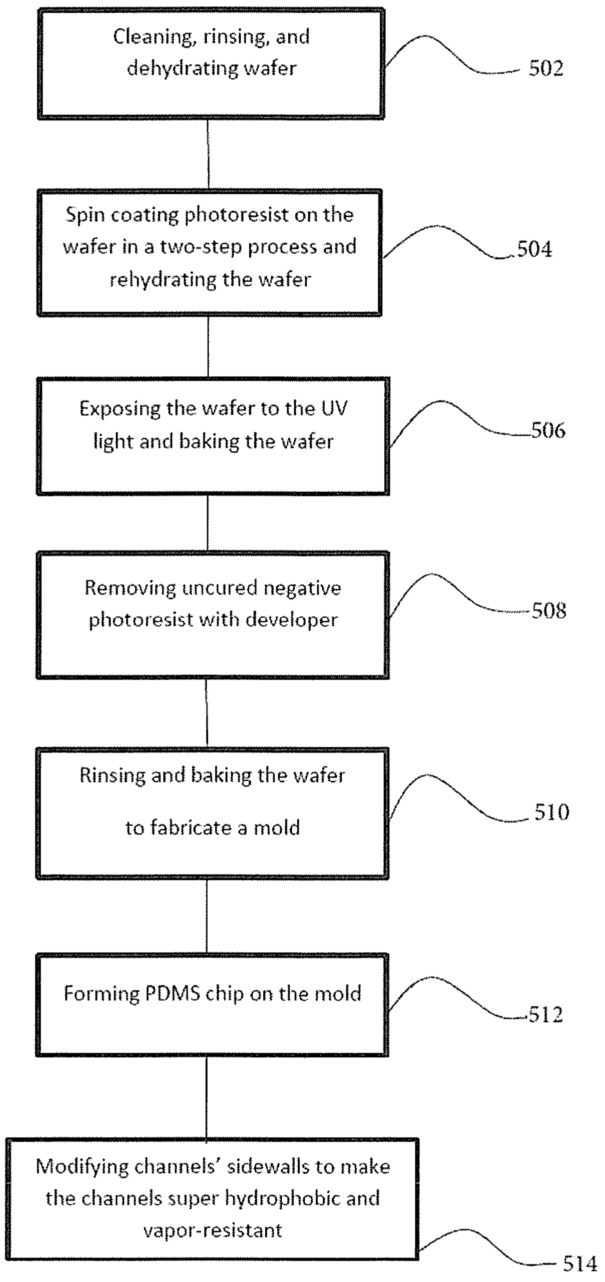
FIG. 5A is a flowchart demonstrating a method for fabricating a microfluidic chip.
Figure 5B:
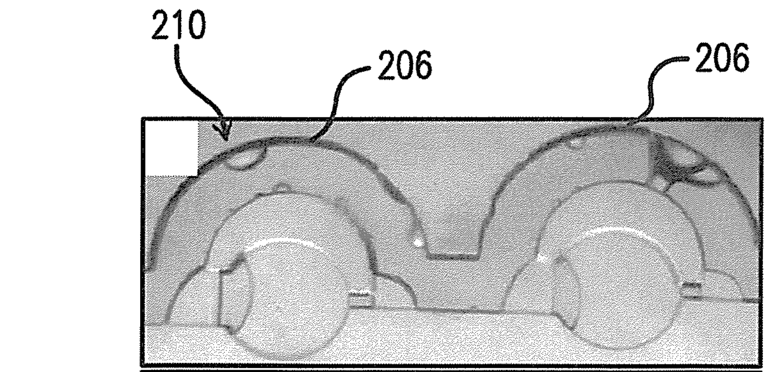
FIG. 5B demonstrates fluid flow in parylene coated PDMS channels causing droplets to break apart.
Figure 5C:
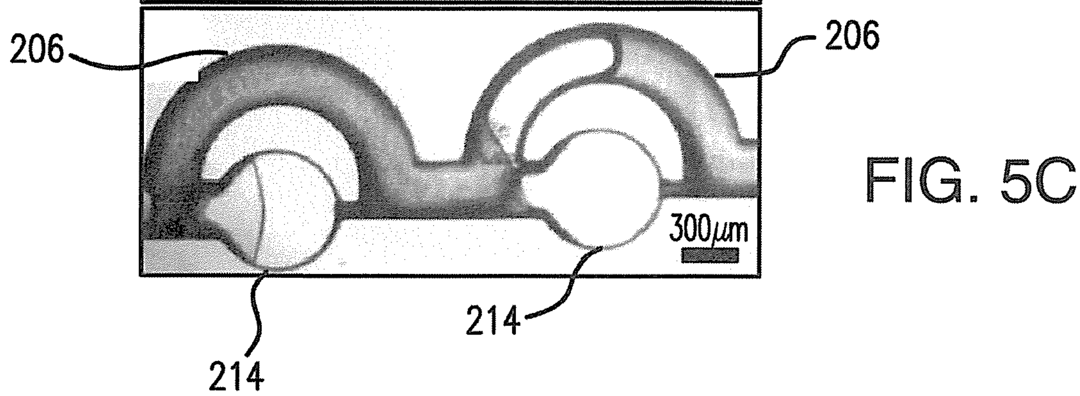
FIG. 5C demonstrates fluid flow in etched and parylene coated superhydrophobic channels that allow droplets to travel smoothly along roughened sidewalls.

FIGS. 5B-C demonstrate a comparison of fluid flow through channels coated with parylene (FIG. 5B) and through etched and parylene coated superhydrophobic channels (FIG. 5C). Each channel according to FIGS. 5B-C includes two loops 210, each of which comprises the trap 214, the upper branch 206, and the lower branch 204. Specifically, FIG. 5B demonstrates fluid flow in parylene coated PDMS channels causing droplets to break apart. Channel modifications with parylene affected the surface energy of the PDMS sidewalls. PDMS is a very hydrophobic material with a contact angle of 115°. Hydrophobic surfaces help prevent aqueous droplets from breaking apart due to high surface tension. As discussed above with the reference to FIG. 5A, parylene is used to create a moisture impermeable barrier in PDMS channels to prevent evaporation during PCR. However, parylene having contact angle of 92° is less hydrophobic than PDMS causing the droplets to break apart resulting in satellite droplets observed throughout the channels. Referring to step 514 as shown in FIG. 5A, superhydrophobic channels are fabricated by etching and subsequently parylene coating channel walls. FIG. 5C demonstrates fluid flow in etched and parylene coated superhydrophobic channels that allow droplets to travel smoothly along the roughened sidewalls without breaking apart.

To generate aqueous sample droplets in air continuous phase on the microfluidic chip 202, a co-flow design is implemented in a droplet generator according to the present invention as demonstrated in FIG. 6. In one non-limiting embodiment, the droplet generator 602 includes a T-junction valve 604, a pipette tip 606, and a capillary 608 with an outer tubing 610 threaded thereon. The T-junction valve includes a first valve inlet 612, a second valve inlet 614, and a valve outlet 616. In one non-limiting embodiment, the outer tubing 610 is attached to the valve outlet 616 with 5-minute epoxy. The inlet of the capillary 608 is attached to the outlet of the pipette tip 606 and inserted through the valve inlet 612 straight to the valve outlet 616. The first valve inlet 612 may be used to introduce an aqueous solution into the inlet channel 208 of the microfluidic chip 202 through the capillary 608. The second valve inlet 614 may be used to introduce air into the inlet channel 208 of the microfluidic chip 202 through the outer tubing 610 threaded onto the capillary 608. After the capillary 608 attached to the pipette tip 606 is inserted into the valve inlet 612 to exit through the valve outlet 616, a seal around the capillary 608 and within the valve outlet 616 is provided. In one non-limiting embodiment, the seal may be made with epoxy. Next, the outer tubing 610 is threaded onto the capillary 608. By way of non-limiting example, an epoxy seal is provided between the outer tubing 610 and the valve outlet 616. By way of non-limiting example, the width of the outer tubing 610 may be 300 μm.

Aqueous solutions are drawn into the capillary 608 and pipette tip 606 using negative pressure. Specifically, the pipette tip is pulsed with low pressure to pneumatically pulse aqueous solutions through the capillary 608, forming droplets at the capillary tip. The low air pressure is controlled with a solenoid valve. At the same time, the T-junction valve 604 is filled with air at a low pressure which flows out the outer tubing 610, sheathing the capillary 608. In one non-limiting embodiment, a 10 μL pipette is pulsed with low pressure <0.05 bar for 70 ms. The pulsed aqueous solution in this embodiment provides a method of producing individual fluid droplets.

In yet another embodiment, a syringe is used to introduce an aqueous solution into the capillary 608. In one non-limiting embodiment, the droplet aqueous solution consisted of 0.2 μm filtered DI water. The aqueous solution was injected into the capillary 608 at a rate of 10 μL/minute with a syringe pump. The continuous air phase, <0.05 bar, was directed into the valve inlet 614 and out through the outer tubing 610. The continuous flow of aqueous solution in the embodiment provides a method of continuously producing fluid droplets.

Figure 7A:
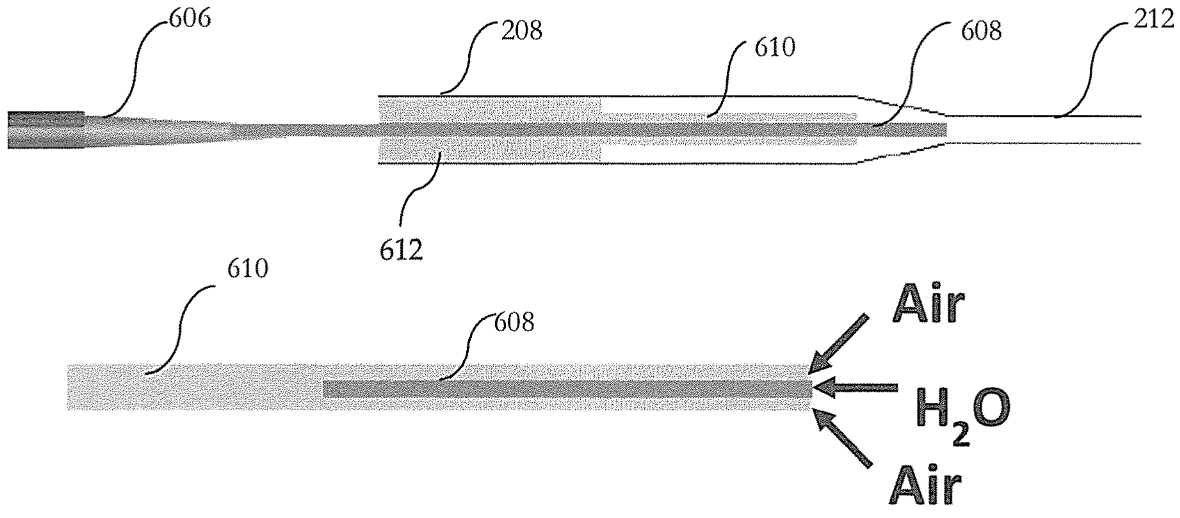
FIG. 7A is a schematic representation of the co-flow droplet generator according to an embodiment of the invention in fluid communication with a microfluidic chip.

FIG. 7A is an arrangement of the co-flow droplet generator 602 (FIG. 6) connected to the microfluidic chip 202 (FIG. 2) according to one embodiment of the present invention. Specifically, the capillary 608 with the outer tubing 610 threaded thereon is inserted into the inlet channel 208 of the microfluidic chip 202. The outer tubing 610 is filled with air while the capillary 608 is filled with an aqueous solution. A seal 612 is provided between the outer tubing 610 and inlet microchannel 208.

Figure 7B:
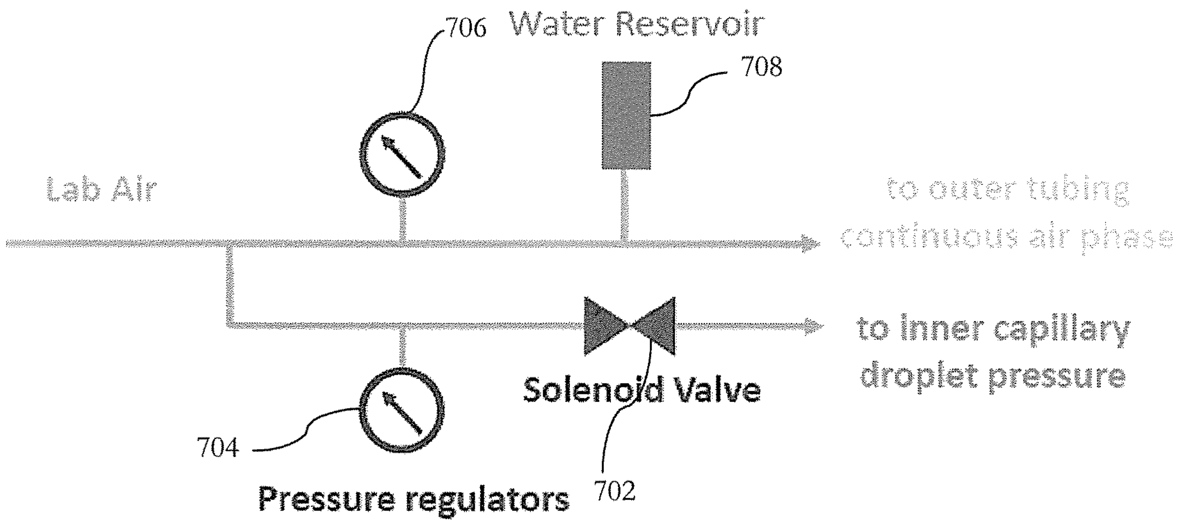
FIG. 7B is a schematic representation of a pressure control system in the droplet generator.

FIG. 7B is a schematic representation of a pressure control system in communication with the droplet generator 602. According to one embodiment of the present invention, aqueous solutions may be drawn into the capillary 608 and pipette tip 618 by applying a negative pressure with a pipette. An air continuous phase is humidified by using a water reservoir 708 before being directed through the second valve inlet 614 and into the outer tubing 610. Low air pressure is applied to pneumatically pulse aqueous solutions through the capillary. In non-limiting example, the applied pressure is less than 0.05 bar and is controlled with a solenoid valve 702 and a pressure regulator 704. As the droplets of aqueous solution are generated at the tip of the capillary 608, the valve 604 is simultaneously filled with air at a low pressure controlled by a pressure regulator 706, wherein the air flows out the outer tubing 610, sheathing the capillary 608. Accordingly, the pressure regulator 707 is configured to form droplets of the aqueous solution by drawing the aqueous solution into the capillary and into the inlet channel 208 of the microfluidic chip, wherein the droplets are sheared off by the air phase continuously introduced through the outer tubing into the inlet channel 208 of the microfluidic chip.

Droplets generated on-chip must also be able to be manipulated. For instance, in a polymerase chain reaction (PCR), droplets may be held stationary to be imaged for fluorescent measurements. The microfluidic chip 202 in communication with the droplet generator 602 may be configured to have geometric dimensions corresponding to the indirect trapping approach ($R_L > R_U$) as shown in FIG. 4B. In this arrangement, droplets of an aqueous solution are continuously formed at the tip of the capillary 608 and then sheared off by air coming out of the outer tubing 610. Turning to FIG. 4B, sheared droplets travel a finite distance down the channel due to the decrease in airflow caused by a subsequent droplet forming at the capillary tip. The leading droplet 1 immobilized in the upper channel 206 increases the hydraulic resistance of that channel relative to the lower channel 204. Subsequently, droplet 2 fills the lower channel trap 204 until the outlet is blocked thereby increasing the hydraulic resistance of the lower channel relative to the upper channel. The leading droplet 1 then continuous through the upper channel 206. The subsequent lagging droplet 3 bypasses the lower channel having the trap 214 filled with droplet 2.

Channel modifications according to the present invention affect the surface energy of the PDMS sidewalls. PDMS is a hydrophobic material with a contact angle of 115°. Hydrophobic surfaces help prevent aqueous droplets from breaking apart due to high surface tension. Thus, the formation of satellite droplets and droplet break-up can be avoided.

Parylene is used to create a moisture impermeable barrier in PDMS channels to prevent evaporation during a polymerase chain reaction (PCR). However, parylene is less hydrophobic than PDMS (contact angle=92°). The surface energy of parylene coated PDMS channels may be lowered by roughening the sidewalls with a PDMS etchant prior to parylene deposition. As the rough sidewalls are superhydrophobic due to the lotus effect, droplets travel smoothly along the roughened sidewalls without breaking apart. Accordingly, the droplet generator in combination with a microfluidic chip according to the present invention can be used for performing biological reactions on droplets trapped on the microfluidic chip. A continuous air phase is an alternative to the oil phase as proteins denature more slowly at an air/water interface. In the microfluidic setup according to the present invention the aqueous phase "drips" into the continuous air phase. The air/water system of the present invention allows for integrating a droplet generator into a microfluidic chip and capturing water droplets into defined microtraps on the chip.

Therefore, in one embodiment, there is provided a method for generating aqueous droplets in an air phase on a microfluidic chip having a network of microchannels including an inlet microchannel. In another embodiment, there is provided a valve structure having a first valve inlet, a second valve inlet, and a valve outlet. In another embodiment, an inner tube in inserted into the first valve inlet and towards the valve outlet. In another embodiment, an outer tube is threaded onto the inner tube, wherein the inner tube and the outer tube are in fluid communication with the inlet microchannel. In another embodiment, the outer tube is sealed within the first inlet. In a further embodiment, a pressure is controlled to form droplets of an aqueous solution by flowing the aqueous solution through the inner tube and into the inlet microchannel. In a further embodiment, the air phase is introduced through the second inlet and the outer tube into the inlet microchannel, wherein the droplets are formed at the tip of the inner tube and then sheared off by air.

In another embodiment, there is provided a system for generating droplets of the aqueous solution in a continuous air phase on a microfluidic chip having a network of microchannels. In one embodiment, the system comprises (i) a valve having a first valve inlet, a second valve inlet, and a valve outlet; (ii) an inner tube inserted into the first valve inlet and towards the valve outlet; (iii) an outer tube threaded onto the inner tube and sealed within the first inlet, wherein the inner tube and the outer tube are in fluid communication with the network of microfluidic microchannels of the microfluidic chip; and (iv) a pressure regulator to form droplets of the aqueous solution by drawing the aqueous solution into the inner tube and into the channel network of the microfluidic chip, wherein the droplets are sheared off by the air phase introduced through the second valve inlet and the outer tubing into the microchannels of the microfluidic chip.

In yet another embodiment of the invention, a method for generating aqueous droplets in an air phase on a microfluidic chip is provided. In some embodiments, the method is performed by using a valve having a first inlet, a second inlet, and an outlet. In another embodiment, the valve is a T-junction and the second valve inlet is perpendicular to the first valve inlet and the valve outlet.

In one embodiment the method comprises inserting a capillary into the first valve inlet and towards the valve outlet. In one embodiment, the capillary has a diameter of from about 10 to about 300 μm, preferably from about 75 to about 200 μm. In another embodiment, the outer tubing may be threaded onto the capillary, wherein the capillary and the outer tubing are in fluid communication with an inlet microchannel of the microfluidic chip. In another embodiment, the outer tubing is sealed within the first inlet. In one embodiment, the outer tubing has a diameter of from about 20-500 μm, preferably around 300 μm. Droplets of an aqueous solution may be formed by applying the pressure to flow the aqueous solution through the capillary and into the inlet microchannel. In a further embodiment, an air phase is continuously introduced through the second inlet and the outer tubing into the inlet microchannel, wherein the droplets are continuously formed at the tip of the inner capillary and then sheared off by air. In another embodiment, the continuous air phase is humidified before directing the air phase through the second valve inlet into the outer tubing.

In yet another aspect of the invention, a system for generating droplets of the aqueous solution in a continuous air phase on a microfluidic chip is provided. The system comprises a valve having a first valve inlet, a second valve inlet, and a valve outlet. In another embodiment, the valve is a T-junction and the second valve inlet is perpendicular to the first valve inlet and the valve outlet.

In one embodiment, the system includes a capillary inserted into the first valve inlet and towards the valve outlet. In one embodiment, the capillary has a diameter of from about 10 to about 300 μm, preferably from about 75 to about 200 μm. In another embodiment, the system provides an outer tubing threaded onto the capillary. In another embodiment, the outer tubing is sealed within the first inlet. In one embodiment, the outer tubing has a diameter of from about 20-500 μm, preferably around 300 μm. The capillary and the outer tubing are configured to be in fluid communication with a network of microfluidic microchannels of the microfluidic chip. In an further embodiment, a pressure regulator is provided to form droplets of the aqueous solution by drawing the aqueous solution into the capillary and into the channel network of the microfluidic chip, wherein the droplets are sheared off by the air phase continuously introduced through the second valve inlet and the outer tubing into the microchannels of the microfluidic chip. In another embodiment, the continuous air phase is humidified before directing the air phase through the second valve inlet into the outer tubing.

In some embodiments, a seal is provided between the capillary and the first valve inlet. In a further embodiment, the seal between the inner capillary and the first inlet is made with epoxy. In yet another embodiment, the capillary and the outer tubing are inserted into the inlet microchannel. In a further embodiment, the outer tubing is sealed to the valve outlet with epoxy.

In a further embodiment, the air phase is continuously introduced through the outer tubing into the inlet microchannel.

In another embodiment, an inlet of a capillary is attached to an outlet of a pipette tip prior to inserting the capillary through the first inlet. In some embodiments, the pipette is a 10 μL pipette. In a further embodiment, the aqueous solution is pneumatically pulsed from the pipette tip, through the capillary, and into the inlet channel of the microfluidic chip by controlling the pressure with a solenoid valve.

In yet another embodiment, a syringe is attached to an inlet of the capillary to continuously introduce the aqueous solution onto the capillary.

In yet another embodiment, the network of microchannels includes a repeated sequence of loops, each loop consisting of an upper branch and a lower branch, each lower branch containing a hydrodynamic trap. In some embodiments, each lower branch is comprised of a channel including various channel widths and geometries and each upper branch is comprised of a channel having a constant width. For instance, in some embodiments, the lower branch may have a channel width of from about 50 to about 500 μm, more preferably from about 85 to about 400 μm, more preferably from about 100 μm to about 300 μm, and preferably about 200 μm. In other embodiments, the upper branch may have a channel width of about of from about 50 to about 500 μm, more preferably from about 85 to about 400 μm, more preferably from about 100 μm to about 300 μm, and preferably about 200 μm. Examples of channel lengths and widths embodied by the present invention can be found in table 1.

In other embodiments, a specific hydraulic resistance ratio of the upper branch to the lower branch is achieved by varying the length of the upper branch and keeping the width of the lower branch set to a specific value. For instance, in some embodiments, the hydraulic ratio may be from 0.5 to about 2.0, preferably from about 0.9 to about 1.6.

In another embodiment, droplets are captured in the hydrodynamic traps by using direct or indirect trapping. In yet another embodiment, the trapped droplet is heated.

In yet a further embodiment, the microchannels of the microfluidic chip are made of PDMS. In another embodiment, the sidewalls of the microchannels in the network are coated with parylene through a chemical vapor deposition process, wherein the sidewalls are roughened with a PDMS etchant prior to parylene deposition.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

All documents cited in this application (“herein-cited documents”) and all documents cited or referenced in herein-cited documents are incorporated herein by reference in their entirety. In addition, any manufacturer’s instructions or catalogues for any products cited or mentioned in each of the application documents or herein-cited documents are incorporated by reference in their entirety. Documents incorporated by reference into this text or any teachings therein can be used in the practice of this invention and, technology in each of the documents incorporated herein by reference can be used in the practice of this invention. Documents incorporated by reference into this text are not admitted to be prior art.

The invention claimed is:

1. A method for generating aqueous droplets in an air phase on a microfluidic chip having a network of microchannels including an inlet microchannel, the method comprising:

providing a valve structure having a first valve inlet, a second valve inlet, and a valve outlet;

inserting an inner tube into the first valve inlet and towards the valve outlet;

threading an outer tube onto the inner tube, wherein the inner tube and the outer tube are in fluid communication with the inlet microchannel;

sealing the outer tube within the first inlet;

controlling a pressure to form droplets of an aqueous solution by flowing the aqueous solution through the inner tube and into the inlet microchannel; and introducing the air phase through the second inlet and the outer tube into the inlet microchannel, wherein the droplets are formed at the tip of the inner tube and then sheared off by air.

* * * * *